June 28, 1960 F. M. SIMMS ET AL 2,943,183
ELECTRODE HOLDER

Filed March 18, 1959 2 Sheets-Sheet 1

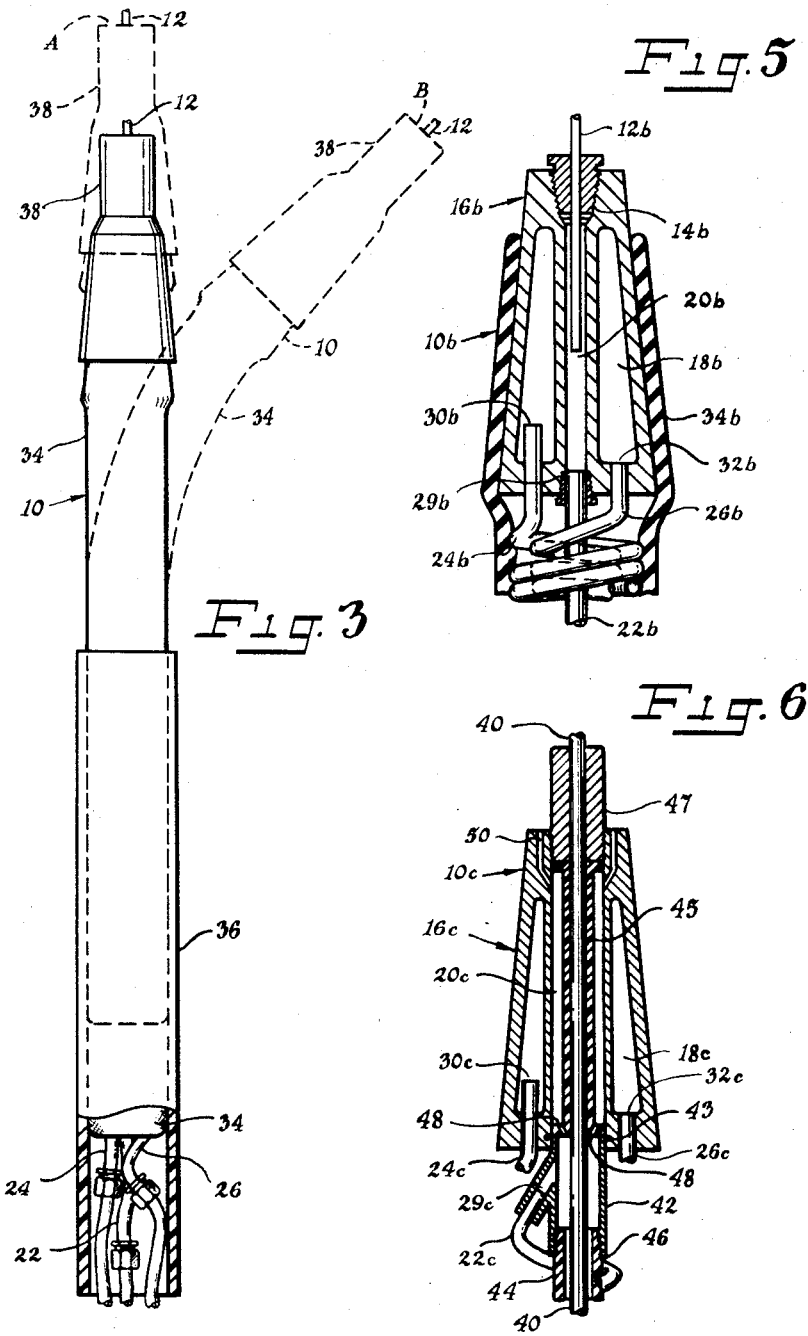

{United States Patent Office}

2,943,183
Patented June 28, 1960

2,943,183
ELECTRODE HOLDER

Forde M. Simms, Irvington, and John V. Warinsky, Oradell, N.J., assignors to Falstrom Company, Passaic, N.J., a corporation of New Jersey Filed Mar. 18, 1959, Ser. No. 800,309

13 Claims. (Cl. 219—144)

The present invention relates to arc-welding apparatus and, more particularly, to an improved electrode holder for such apparatus.

The rapid development and universal acceptance of electric-arc welding for the joining of metal members has led to the development of many types of electrode holders or welding guns. For example, gas-shielded electric-arc-welding apparatus of the type shown in U.S. Patent No. 2,694,764, issued November 4, 1954, to A. Meuller, is used for inert-gas shielded alternating-current arc welding with a consumable or depositing electrode and is provided with a longitudinally disposed or straight electrode holder. For welding metals, such as magnesium, aluminum, stainless steel, and special alloys and bronzes, where high welding currents are involved, water-cooled, gas-shielded arc-welding apparatus (of the type shown in U.S. Patent No. 2,468,806, issued May 3, 1949, to F. J. Pilia), having a substantially non-consumable electrode of tungsten is manufactured with a similar longitudinally disposed (straight) electrode holder. To provide greater maneuverability for the consumable-type electrode arc-welding apparatus in the arc welding of metal members, electrode holders having their electrode-gripping portion angularly disposed with respect to the hand-gripping portion of the electrode holder (of the type shown in U.S. Patent No. 2,468,808, issued May 3, 1949, to F. M. Drake), have been developed. A further example of such angularly-disposed electrode holders of the manual type is shown in U.S. Patent No. 2,514,060, issued July 4, 1950, to L. F. Himmelman. A similar angularly disposed electrode holder of the manual type or the machine type is shown in U.S. Patent No. 2,512,706, issued June 27, 1950, to N. E. Anderson.

Although the above-mentioned conventional electrode holders are satisfactory for some arc-welding operations, the rigid integral construction of both the longitudinally-disposed (straight) electrode holders and angularly-disposed electrode holders prevents longitudinal adjustment or further angular adjustment of the operating end of the electrode with respect to the hand-gripping portion of such electrode holders. Such flexibility of longitudinal and angular disposition of the electrode is necessary to satisfactorily arc weld corner members or to arc weld together inaccessible interior members. As a result it is necessary for the metal-fabricating manufacturer to stock a large number of electrode holders, some having such operating end of the electrode disposed at various longitudinal distances from the hand-gripping or machine-gripping portions thereof and others having such operating end angularly disposed at various angles with respect to such gripping portions of the electrode holders.

The problem of the metal-fabricating manufacturer is further complicated by the rising spiral of labor costs, which costs are increased by the lost production time required to obtain a replacement electrode holder, to change from one electrode holder to the other electrode holder and to adjust the apparatus and the replacement electrode holder to proper operating conditions before proceeding with the metal-fabricating operation.

We are aware of the many unsuccessful attempts in the prior art to provide a flexible electrode holder which is operable to provide controlled longitudinal displacement of an angular disposition of the operating end of the electrode with respect to the manual or machine-gripping portions of the electrode holder; which disposition can be maintained in such desired position without variation therefrom; which is simple and rugged in structure but light in weight; which retains its flexibility and has a long operational life; and which is low in cost and comparable in price to conventional rigid electrode holders.

One of the earliest efforts to provide variation of the angular disposition of the electrode relative to the gripping portion of the electrode holder is disclosed in U.S. Patent No. 1,316,334, issued September 16, 1919, to A. Schneider. This electrode holder secured the electrode in a transverse groove provided in a disc rotatable with respect to one of two lugs and retained in such groove by an oppositely disposed plate riveted to the other lug. By turning the electrode and the disc through any desired angle relative to the body of the electrode holder the desired disposition is obtained. The heat generated by the arc-welding operation causes the many complicated moving parts to oxidize and stick together thereby eliminating its usefulness. In addition, no longitudinal flexibility is provided.

A welding electrode which may be limitedly disposed in a desired direction and yet is readily detachable from the electrode holder is disclosed in U.S. Patent No. 1,462,620, issued July 24, 1923, to C. C. Peeler. A detachable electrode holder is provided having a stationary disc-like jaw and a spring-biased similarly shaped movable jaw, each provided with a plurality of radially disposed cooperating grooves in which the electrode may be disposed to provide a limited variety of angular dispositions of the electrode with respect to the jaws. This electrode holder suffers from the limitation that angular disposition thereof which is dependent upon groove disposition. No longitudinal flexibility of the electrode is provided. The cumbersome size of the jaws prevents the arc-welding operator from reaching inaccessible members and corners. Its life is limited by the heat deterioration of the spring biasing on such jaws.

U.S. Patent No. 1,746,207, issued February 4, 1930, to P. P. Alexander, discloses a consumable-type electrode holder having the metallic electrode fed from feed rolls through a flexible electrode guide tube to the welding tool. No provision is made for longitudinal or angular flexibility of the operating end of the consumable electrode with respect to the handle.

The allegedly flexible consumable-type electrode holder of U.S. Patent No. 2,307,553, issued January 5, 1943, to I. F. Weller, utilizes a stationary tube-supporting member disposed within the handle and a movable tube-supporting member projecting from the handle and movable longitudinally with respect thereto by means of telescoping screw members. An electrode-holding and gas-conducting metal tube is attached to one tube-supporting member and movable lengthwise of the other, with the electrode carrying ends of such metal tubes projecting from the movable tube-supporting member. While the metal tubes are limitedly longitudinally movable with respect to the handle, such metal tubes rapidly become work hardened under repeated angular positioning of the electrodes and soon break, thus providing a relatively short operational life.

The electrode holder of U.S. Patent No. 2,384,999, issued September 18, 1945, to P. W. Heinrich, is adapted to hold an electrode at various angles for operator convenience and is similar to the electrode holder of the above-mentioned U.S. Patent No. 1,462,620. This electrode holder has a stationary jaw provided with crossed grooves, a transverse groove and a longitudinal groove. In the chosen one groove of the jaw, an electrode is placed and held therein by a spring-biased hand-operated cam jaw. This electrode holder is subject to the same limitations as the above-mentioned patented electrode holder.

In U.S. Patent No. 2,404,437, issued July 23, 1946, to T. S. Donnelly, Jr., the angularly-disposable electrode holder mounts the slotted jaws on a supporting prong which is pivotable on tongues on a supporting bar and a cable connector of the holder. Bosses on the supporting prong engage recesses in one tongue to lock the operating end of the electrode in the desired angular disposition with respect to the handle. This locking arrangement limits the angles at which the electrode may be extended. The heat generated by the welding current oxidizes the joint, thereby making angular disposition of the electrode difficult and sometimes impossible. In addition, separate tools are required to loosen and tighten the bolt at the pivot. Further, hollow gas and water inlet lines may not be used with this construction.

The toolless underwater electrode holder (shown in U.S. Patent No. 2,433,018, issued December 23, 1947, to B. Ronay), utilizes a swivel joint comprising a rotatable elbow member in tapered engagement with the swivel housing, to permit angular disposition of the electrode. To retain the swivel joint in its adjusted position a friction brake is used having a threaded plug which urges contact discs forward thereby locking the elbow member and housing together. No longitudinal flexibility is provided. Welding-current heat causes the threaded plug to oxidize and stick, thereby requiring the use of tools to adjust the holder. The complexity of the device renders its cost prohibitive.

The inert gas-shielded welding torch of U.S. Patent No. 2,547,872, issued April 3, 1951, to R. P. Kissick, includes a hinge connection between the handle and torch body to permit adjustment of the angle between the torch body and handle, utilizing flexible moldable rubber gas and water lines therebetween to permit relative movement between the two parts. The use of flexible rubber lines results in leakage of gas and water at their clamped joints. The generated heat of the welding operation tends to dry and ultimately crack the rubber lines. Again the cost of the complicated welding torch reduces its use to special applications. Tools are required to adjust it. No longitudinal flexibility is afforded.

The closest approach to the long sought successful solution to the problem is disclosed in U.S. Patent No. 2,555,017, issued May 29, 1951, to R. W. Tuthill. This electrode holder uses a deformable copper tube to supply gas and electricity to the electrode, which copper tube is covered with an electrically-insulating heat-resistant flexible sheath. A detachable coupling assembly connects the copper tube and flexible sheath at one end to the insulating handle and an electrode-gripping means is hermetically mounted on the other end. After repeated bending the copper tube work hardens, becomes immobile and breaks. No provision is made for cooling-water connections for the electrode, thus limiting the electrode holder's use to low-welding currents. No longitudinal flexibility is afforded.

Finally, electrode-holding means were provided in the welding torch of U.S. Patent No. 2,863,983, issued December 9, 1958, to J. S. Kane et al., whereby the electrode may be mechanically adjusted in the torch to provide proper spacing between the work and the electrode. Obviously, the longitudinal flexibility is limited. Angular flexibility is not considered.

It is the general object of the present invention to avoid and overcome the foregoing and other difficulties of and objections to prior-art practices by the provision of an improved flexible electrode holder which is operable to provide controlled longitudinal displacement of and angular disposition of the operating end of the electrode with respect to the manual or machine-gripping portions of the electrode holder.

Another object of the present invention is the provision of an improved flexible electrode holder which can be maintained in the desired position without variation therefrom without the use of tools or the expenditure of valuable work time.

Still another object of the present invention is the provision of an improved flexible electrode holder which is simple and rugged in structure but light in weight.

Yet another object of the present invention is the provision of a flexible electrode holder which retains its flexibility and does not work harden during its entire long operable life.

A further object of the present invention is an improved flexible electrode holder which is low in cost and comparable in price to the conventional rigid electrode holders.

A still further object of the present invention is the provision of an improved flexible compact electrode holder adapted for comfortable use on various types of joints and corners in a multitude of work assemblies, which joints and corners would otherwise be inaccessible to conventional rigid electrode holders.

A still further object of the present invention is the provision of an improved flexible electrode holder which is universally adapted to perform welding operations which heretofore required the use of a large number of conventional rigid electrode holders.

The aforesaid objects of the present invention and other objects which will become apparent as the description proceeds are achieved by mounting a novel arrangement of the gas and electrical power and water lines in a flexible electrically insulating, heat resistant sheath which is mounted in frictional engagement with the manual or machine-gripping portion or handle of the electrode holder and longitudinally reciprocable with respect to such holder to provide the desired longitudinal flexibility. The novel arrangement of the gas and electrical power and water lines consists of forming one of the lines into a helix to serve as a rigid but flexible core member and similarly winding one or more of the other lines about the core member to provide the desired flexibility for the angular disposition of the operating end of the electrode with respect to the handle.

For a better understanding of the present invention reference should be had to the accompanying drawings, wherein like numerals of reference indicate similar parts throughout the several views and wherein:

Fig. 3 is a side-elevational view of the improved flexible electrode holder of the present invention and illustrating the flexibility of such electrode holder.

Fig. 5 is a view similar to Figs. 2 and 4 but of a water-cooled gas-shielded electrode holder for use with a non-consumable electrode and having two helixes, one for the cooling-water inlet line and one for the cooling-water outlet line.

Fig. 6 is a view similar to Figs. 2, 4 and 5 but of a water-cooled gas-shielded electrode holder for use with a consumable electrode and having an arrangement of supply lines similar to the three helix arrangement of Fig. 2.

Although the principles of the present invention are broadly applicable to electrode holders of both the consumable electrode and non-consumable electrode type and although such improved electrode may be of the manual type or of the machine type, the present invention is particularly adapted for use in conjunction with a water-cooled gas-shielded electrode holder for use with a non-consumable electrode and hence it has been so illustrated and will be so described.

Figure 1:
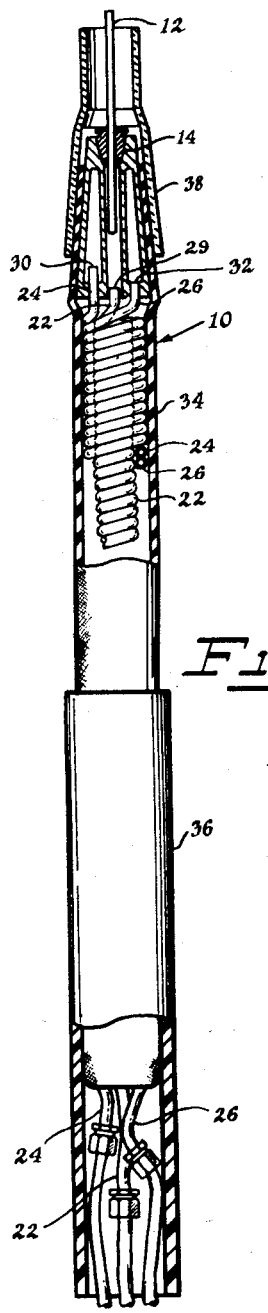
Fig. 1 is a vertical-sectional view of the improved flexible electrode holder of the present invention and showing the details of the novel arrangement of the gas and electrical power and water lines employed therein.

With specific reference to the form of the present invention illustrated in the drawings, and referring particularly to Fig. 1, the improved electrode holder of the present invention is indicated generally by the reference numeral 10.

To provide means for mounting a non-consumable electrode 12 in the electrode holder 10, such electrode 12 is inserted into a refractory metal collet 14 which is threadably secured to the upper portion of the electrode-supporting means or cooling head 16. This cooling head 16 is provided with a cooling-water chamber 18 and an axial electrode-receivng chamber 20 into which the electrode 12 extends. A novel arrangement of an inert-gas inlet line 22 and a cooling-water inlet line 24 and cooling-water outlet line 26 is connected to the electrode-receiving chamber 20 and the cooling-water chamber 18. The inert gas, suitably argon, flows into the electrode-receiving chamber 20 at 29 and through the chamber 20 and gas-outlet ports (not shown) in the collet 14. The cooling water flows through the cooling-water inlet line 24 and into the cooling-water chamber 18 at 30 and returns at 32 via the cooling-water outlet line 26 to the source (not shown).

The cooling-water inlet and outlet lines 24 and 26 also serve as the electrical-power connections for the electrode 12.

The above-mentioned novel arrangement of the gas line 22 and cooling-water lines 24 and 26 is formed by first winding one of these lines (formed of hollow copper tubing), suitably the inert-gas inlet line 22, around a mandrel (not shown) in the form of a helix to form a flexible but rigid core member. The other lines 24 and 26 are then wound in the form of a helix (in side by side relationship to limit the outside diameter of such novel arrangement) on the helix formed from the inert-gas inlet line 22 as a mandrel. The original mandrel (not shown) is then withdrawn and the novel arrangement of the gas and water lines secured to the cooling head 16 at 29, 30 and 32, as by brazing. The integral cooling head 16 and the novel arrangement of the gas and water lines are then molded into a flexible electrically-insulating, heat-resistant sheath 34, suitably a rubber casing. This sheath 34 is then inserted into frictional engagement with a hollow but rigd electrically-insulating, heat-resistant handle 36, suitably a hard plastic, such as nylon, which handle 36 is adapted for manual or machine use. To complete the improved electrode holder 10 of the present invention, a ceramic cup 38 is pushed downwardly over the upper portions of the sheath 34 (Fig. 1), which upper portions surround the cooling head 16 and into frictional engagement therewith, thereby surrounding the operating end of the electrode 12 in an atmosphere of protective argon.

Referring now to Fig. 3 it will be understood by those skilled in the art that the improved electrode holder 10 of the present invention is manually movable longitudinally with respect to the handle 36 from the solid-line position shown in such figure to the dotted-line position, indicated by the reference letter "A," thereby positioning the operating end of the electrode 12 in a desired longitudinal position. The frictional contact between the sheath 34 and the handle 36 maintains this longitudinal disposition of the operating end of the electrode 12 unless varied therefrom manually by the arc-welding operator. In addition, the novel flexible helical arrangement of the gas and water lines further permits disposition of the operating end of such electrode 12 at any desired angle with respect to the longitudinal axis of the handle 36, as for example, the dotted-line position marked "B." It will be further understood that this novel flexible helical arrangement of the gas and water lines provides sufficient rigidity to maintain the operating end of the electrode 12 in this desired angular disposition without deviation therefrom unless such angular disposition is varied manually therefrom by the arc-welding operator.

Figure 2:
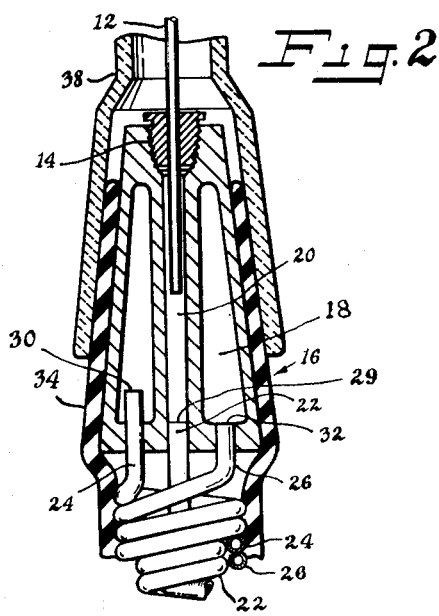
Fig. 2 is an enlarged fragmentary vertical-sectional view of the upper portion of the improved flexible electrode holder shown in Fig. 1 and showing the details of the connections between the novel arrangement and the electrode-supporting means.
Figure 4:
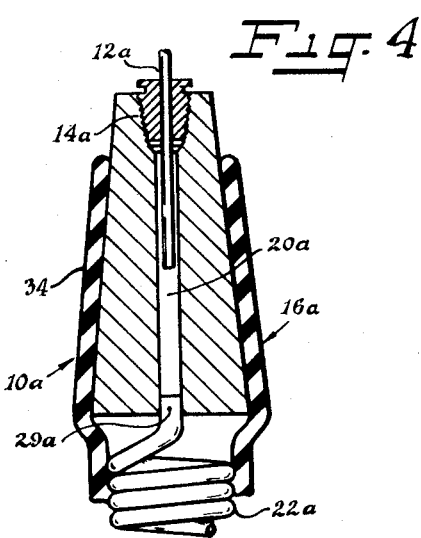
Fig. 4 is a view similar to Fig. 2 but of an air-cooled gas-shielded electrode holder for use with a non-consumable electrode.

It will be recognized by those skilled in the art that the novel flexible helical arrangement of the supply lines may also be utilized in conjunction with electrode holders 10a, 10b and 10c shown in Figs. 4, 5 and 6 respectively. In such Figs. 4, 5 and 6 the reference numerals followed by the subscripts "a," "b" and "c" indicate elements similar to those bearing like reference numerals in Figs. 1, 2 and 3.

Referring to the air-cooled gas-shielded electrode holder 10a shown in Fig. 4 and for use with a non-consumable electrode 12a, it will be noted that the novel flexible helical arrangement comprises a single helix, namely the inert-gas inlet line 22a secured to the cooling head 16a at 29a.

In the water-cooled gas-shielded electrode holder 10b shown in Fig. 5 for use with a non-consumable electrode 12b, the novel flexible helical arrangement consists of two helixes, a core member, suitably the cooling-water outlet line 26b and the outer helix, the cooling-water inlet line 24b. In this embodiment the inert-gas inlet line comprises a flexible plastic tubing 22b, suitably nylon, connected to the electrode-receiving chamber 20b at 29b by a threadable connection.

From a consideration of Fig. 6 it will be understood that the water-cooled gas-shielded electrode holder 10c for use with a consumable electrode 40 utilizes an inert-gas inlet line 22c as the core member of the novel flexible helical arrangement of the supply lines. The upper end of such inert-gas inlet line 22c, as viewed in Fig. 6, is connected at 29c to a Y-connection 42 secured to the bottom of the electrode-receiving chamber 20c at 43, as by brazing. As in the arrangement of Fig. 2, the cooling-water inlet line 24c and cooling-water outlet line 26c are wound in side by side relationship about the inert-gas inlet line 22c. To provide electrode-guide means, a flexible guide tube 44 for the consumable electrode 40 is frictionally inserted into the inner helix 22c and is secured, as by threading, at 46 to the bottom of the Y-connection 42. It will be noted a nylon guide tube 45 inserted in the electrode-receiving chamber 18c serves as an intermediate guide tube and a refractory metal contact tip 47 serves as the upper guide tube for the consumable electrode 40. Argon gas flows into the Y-connection 42 at 29c, through ports 48 in the lower flange of the intermediate guide tube 45, as viewed in Fig. 6, through the electrode-receiving chamber 20c and thence through apertures 50 in the cooling head 16c into the space between the ceramic cup (not shown) and the collet 14c and consumable electrode 40.

It will be recognized by those skilled in the art that the objects of the present invention have been achieved by the provision of an improved flexible electrode holder which is operable to provide controlled longitudinal displacement of and controlled angular disposition of the operating end of the electrode with respect to the handle of the electrode holder. Such improved flexible electrode holder can be maintained in the predetermined desired position without the use of tools or the loss of excessive valuable work time and will not vary from such predetermined disposition unless manually forced therefrom by the operator.

This improved flexible electrode holder is simple, compact and rugged in structure but is beneficially light in weight. Additionally, the improved flexible electrode holder retains its flexibility and does not work harden during its entire long operating life. Further, such improved flexible electrode holder is low in cost and comparable in price to the conventional rigid electrode holders. As a further advantage the improved flexible electrode holder is adapted for comfortable use for the welding of various types of inaccessible joints and corners, the welding of which inaccessible joints and corners might not otherwise be accomplished by conventional rigid electrode holders.

A still further advantage of the improved flexible electrode holder is that it is universally adapted to perform welding operations which heretofore required the use of a large number of conventional rigid electrode holders of various lengths and angular disposition.

While in accordance with the patent statutes one best known embodiment of the present invention has been illustrated and described in detail, it is to be particularly understood that the invention is not limited thereto or thereby.

We claim:

1. For an electrode holder adapted for use in electric arc welding and having an electrode-supporting means, a conduit formed into a helix and connected at one end to said electrode-supporting means to provide flexible mounting means for said electrode-supporting means thereby permitting controlled angular disposition of the electrode-supporting means as desired with respect to the other end of the conduit.

2. For an electrode holder adapted for use in electric arc welding and having an electrode-supporting means, a conduit formed into a helix and connected at one end to said electrode-supporting means to provide flexible mounting means for said electrode-supporting means thereby permitting controlled angular disposition of the electrode-supporting means as desired with respect to the other end of the conduit, and a flexible sheath disposed about said conduit and said electrode-supporting means for use as electrical and heat resistant means.

3. For an electrode holder adapted for use in electric arc welding and having an electrode-supporting means, a handle, a conduit formed into a helix and connected at one end to said electrode-supporting means to provide flexible mounting means for said electrode-supporting means thereby permitting controlled angular disposition of the electrode-supporting means as desired with respect to the other end of the conduit, and a flexible sheath disposed about said conduit and said electrode-supporting means, said sheath being insertable into said handle and movable longitudinally with respect to the handle to longitudinally position said electrode-supporting means as desired with respect to said handle.

4. For an electrode holder adapted for use in electric arc welding and having an electrode-supporting means, a first conduit formed into a helix and connected at one end to said electrode-supporting means, and a second conduit formed into a helix about said first conduit and also connected at one end to said electrode-supporting means, said first and second conduits providing flexible mounting means for said electrode-supporting means thereby permitting controlled angular disposition of the electrode-supporting means as desired with respect to the other ends of the conduits.

5. For an electrode holder adapted for use in electric arc welding and having an electrode-supporting means, a first conduit formed into a helix and connected at one end to said electrode-supporting means, and a second and a third conduit formed in side by side relationship into helixes about said first conduit and also connected at one end to said electrode-supporting means, said first conduit, said second conduit and said third conduit providing flexible mounting means for said electrode-supporting means thereby permitting controlled angular disposition of the electrode-supporting means as desired with respect to the other ends of the conduits.

6. For an electrode holder adapted for use in electric arc welding and having an electrode-supporting means, a flexible conduit connected at one end to said electrode-supporting means, a second conduit formed into a helix and disposed about said flexible conduit, said second conduit being connected at one end to said electrode-supporting means, and a third conduit formed into a helix about said second conduit and also connected at one end to said electrode-supporting means, said second and third conduits providing flexible mounting means for said electrode-supporting means thereby permitting controlled angular disposition of the electrode-supporting means as desired with respect to the other ends of the conduits.

7. An electrode holder adapted for use in gas-shielded electric arc welding, comprising an electrode-supporting means, a gas-inlet conduit formed into a helix and connected at one end to said electrode-supporting means to provide flexible mounting means for said electrode-supporting means thereby permitting controlled angular disposition of the electrode-supporting means as desired with respect to the other end of the gas-inlet conduit, and a flexible sheath disposed about said gas-inlet conduit and said electrode-supporting means for use as electrical and heat resistant means.

8. An electrode holder adapted for use in gas-shielded electric arc welding, comprising an electrode-supporting means, a handle, a gas-inlet conduit formed into a helix and connected at one end to said electrode-supporting means to provide flexible mounting means for said electrode-supporting means thereby permitting controlled angular disposition of the electrode-supporting means as desired with respect to the other end of the gas-inlet conduit, and a flexible sheath disposed about said gas-inlet conduit and said electrode-supporting means, said sheath being insertable into said handle and movable longitudinally with respect to the handle to longitudinally position said electrode-supporting means as desired with respect to said handle.

9. A water-cooled electrode holder adapted for use in electric arc welding, comprising an electrode-supporting means, a first water conduit formed into a helix and connected at one end to said electrode-supporting means, a second water conduit formed into a helix about said first water conduit and also connected at one end to said electrode-supporting means, said first and second water conduits providing flexible mounting means for said electrode-supporting means thereby permitting controlled angular disposition of the electrode-supporting means as desired with respect to the other ends of the conduits, and a flexible sheath disposed about said second water conduit and said electrode-supporting means for use as electrical and heat resistant means.

10. A water-cooled electrode holder adapted for use in gas-shielded electric arc welding, comprising an electrode-supporting means, a gas-inlet conduit formed into a helix and connected at one end to said electrode-supporting means, a first water conduit and a second water conduit formed in side by side relationship into helixes about said gas-inlet conduit and also connected at one end to said electrode-supporting means, said gas-inlet conduit, said first water conduit and said second water conduit providing flexible mounting means for said electrode-supporting means thereby permitting controlled angular disposition of the electrode-supporting means as desired with respect to the other ends of the conduits, and a flexible sheath disposed about said first and second water conduits and said electrode-supporting means for use as electrical and heat resistant means.

11. A water-cooled electrode holder adapted for use in gas-shielded electric arc welding, comprising an electrode-supporting means, a flexible gas-inlet conduit connected at one end to said electrode-supporting means, a first water conduit formed into a helix and disposed about said gas-inlet conduit, said first water conduit being connected at one end to said electrode-supporting means, a second water conduit formed into a helix about said first water conduit and also connected at one end to said electrode-supporting means, said first and second water conduits providing flexible mounting means for said electrode-supporting means thereby permitting controlled angular disposition of the electrode-supporting means as desired with respect to the other ends of the conduits, and a flexible sheath disposed about said second water conduit and said electrode-supporting means for use as electrical and heat resistant means.

12. A water-cooled electrode holder adapted for use in gas-shielded electric arc welding, comprising an electrode-supporting means, a handle, a gas-inlet conduit formed into a helix and connected at one end to said electrode-supporting means, a first water conduit and a second water conduit formed in side by side relationship into helixes about said gas-inlet conduit and also connected at one end to said electrode-supporting means, said gas-inlet conduit, said first water conduit and said second water conduit providing flexible mounting means for said electrode-supporting means thereby permitting controlled angular disposition of the electrode-supporting means as desired with respect to the other ends of the conduits, and a flexible sheath disposed about said first and second water conduits and said electrode-supporting means for use as electrical and heat resistant means, said sheath being insertable into said handle and movable longitudinally with respect to the handle to longitudinally position said electrode-supporting means as desired with respect to said handle.

13. A water-cooled electrode holder adapted for use in gas-shielded electric arc-welding apparatus of the consumable type, comprising electrode-guide means, a handle, a gas-inlet conduit formed into a helix and connected at one end to said electrode-guide means, a first water conduit and a second water conduit formed in side by side relationship into helixes about said gas-inlet conduit and also connected at one end to said electrode-guide means, said gas-inlet conduit, said first water conduit and said second water conduit providing flexible mounting means for said electrode-guide means thereby permitting controlled angular disposition of the electrode-guide means as desired with respect to the other ends of the conduits, and a flexible sheath disposed about said first and second water conduits and said electrode-guide means for use as electrical and heat resistant means, said sheath being insertable into said handle and movable longitudinally with respect to the handle to longitudinally position said electrode-guide means as desired with respect to said handle.

References Cited in the file of this patent

UNITED STATES PATENTS

| | | |
|---|---|---|
| 1,946,306 | Catlett | Feb. 6, 1934 |
| 2,011,872 | Rava | Aug. 20, 1935 |
| 2,439,874 | Suter | Apr. 20, 1948 |
| 2,555,017 | Tuthill | May 29, 1951 |

UNITED STATES PATENT OFFICE
CERTIFICATE OF CORRECTION

Patent No. 2,943,183                                                               June 28, 1960

Forde M. Simms et al.

It is hereby certified that error appears in the printed specification of the above numbered patent requiring correction and that the said Letters Patent should read as corrected below.

Column 1, line 45, for "angularly disposed" read -- angularly-disposed --; column 2, line 6, for "of an" read -- of and --; line 41, strike out "which"; column 4, line 55, strike out the colon and insert instead a semi-colon; lines 60, 63, and 71, strike out the period and insert instead a semi-colon; column 5, line 21, for "electrode-receivng" read -- electrode-receiving --; line 53, for "rigd" read -- rigid --; line 67, for '"A,"' read -- "A", --; column 6, line 2, for '"B."' read -- "B". --; line 14, for '"a,"' read -- "a", --.

Signed and sealed this 27th day of December 1960.

(SEAL)
Attest:

KARL H. AXLINE                                                  ROBERT C. WATSON
Attesting Officer                                       Commissioner of Patents